(12) United States Patent
Hrycyk et al.

(10) Patent No.: US 7,501,033 B2
(45) Date of Patent: Mar. 10, 2009

(54) CHIPPER AND APEX SUBASSEMBLY AS AN INTERMEDIATE ARTICLE OF MANUFACTURE

(75) Inventors: Richard Nicholas Hrycyk, Canton, OH (US); Donald Chester Kubinski, Medina, OH (US); Richard Joseph Piccin, Uniontown, OH (US)

(73) Assignee: The Goodyear Tire & Rubber Co, Akron, OH (US)

( * ) Notice: Subject to any disclaimer, the term of this patent is extended or adjusted under 35 U.S.C. 154(b) by 81 days.

(21) Appl. No.: 11/470,280

(22) Filed: Sep. 6, 2006

(65) Prior Publication Data

US 2008/0053595 A1    Mar. 6, 2008

(51) Int. Cl.
*B29D 30/06* (2006.01)
*B29D 30/18* (2006.01)
*B29D 30/32* (2006.01)
*B60C 15/06* (2006.01)

(52) U.S. Cl. .................... 156/110.1; 156/123; 156/124; 156/398; 156/403; 152/539

(58) Field of Classification Search ................. 156/403, 156/450, 523, 209.1, 136; 152/539, 110.1, 152/131
See application file for complete search history.

(56) References Cited

U.S. PATENT DOCUMENTS

| | | | |
|---|---|---|---|
| 1,759,669 A | 5/1930 | Stevens | |
| 1,944,768 A | 1/1934 | Stevens | |
| 4,196,036 A | 4/1980 | Allen et al. | |
| 4,319,943 A | 3/1982 | Bayuga | |
| 4,933,034 A | 6/1990 | Kokubu et al. | |
| 5,080,738 A | 1/1992 | Araki et al. | |
| 5,282,912 A | 2/1994 | Kokubu et al. | |
| 5,294,275 A | 3/1994 | Kawaguchi et al. | |
| 5,326,508 A * | 7/1994 | Kaefer et al. | 264/28 |
| 5,328,533 A | 7/1994 | Yasuno et al. | |
| 5,403,418 A | 4/1995 | Kikuchi et al. | |
| 6,117,269 A * | 9/2000 | Pizzorno | 156/421.4 |
| 6,135,183 A | 10/2000 | Oare | |
| 6,264,780 B1 | 7/2001 | Iwanaga et al. | |

(Continued)

FOREIGN PATENT DOCUMENTS

DE    102004059771    6/2006

(Continued)

*Primary Examiner*—Justin Fischer
(74) *Attorney, Agent, or Firm*—David L King (57) ABSTRACT

A chipper and apex subassembly 100 as an intermediate article of manufacture in a pneumatic tire has an apex strip 30 formed as a continuous elastomeric strip of unvulcanized material having a bottom base portion 31 and two opposing sides 33, 34 extending towards the narrow outer tip 32 and a chipper ply strip 40 reinforced with parallel cords oriented on a bias angle relative to the length of the strip cojoined to the apex 30 along the length of the strips and attached to one side of the unvulcanized apex strips on an outer surface. The chipper 40 is spaced from the bottom base portion 31 of the apex 30 and extends widthwise towards the narrow outer tip 32 to form a subassembly 100 of a chipper 40 and apex 30 as an intermediate article of manufacture. Additionally the subassembly 100 can be attached to bead core 12 to make a subassembly 200 as a further intermediate article of manufacture.

9 Claims, 9 Drawing Sheets

U.S. PATENT DOCUMENTS 6,630,045 B1  10/2003  Roedseth

FOREIGN PATENT DOCUMENTS

| | | |
|---|---|---|
| EP | 0312388 | 4/1989 |
| EP | 0466924 | 1/1992 |
| EP | 1145874 | 10/2001 |
| EP | 1418043 | 5/2004 |
| EP | 1142695 | 5/2006 |
| EP | 1207033 | 6/2006 |
| JP | 11105155 | 4/1999 |
| JP | 2001-55023 * | 2/2001 |
| JP | 2004017862 | 1/2004 |
| WO | WO2006035560 | 4/2006 |

* cited by examiner

CHIPPER AND APEX SUBASSEMBLY AS AN INTERMEDIATE ARTICLE OF MANUFACTURE

FIELD OF THE INVENTION

The present invention relates to pneumatic tires and their manufacture more particularly to an intermediate article of manufacture and a method of manufacturing the intermediate article of manufacture.

BACKGROUND OF THE INVENTION

Pneumatic tires are made from rubber synthetic elastomeric components some of which are cord reinforced with synthetic textile or steel wire cords.

Typically in passenger or light truck tires the synthetic cords are used in the carcass ply fabric and the wire cords are disposed in the belt structure. Heavy duty truck tires may use steel wired cords in both the carcass ply and the belt structure.

The tire is generally mounted onto a rim secured by a pair of bead reinforcing structures each having a bead core comprised of a coil of steel wires with an elastomeric filler commonly called an apex due in part to its somewhat elongated triangular shape. Sometimes a cord reinforced flipper could be used wrapped about the bead core and the flipper with the bed core and apex components could be pre-assembled to form an intermediate article of manufacture that later could be assembled into a "green" or unvulcanized tire carcass toroidally shaped prior to applying the belt reinforcing structure and tread rubber. Thereafter the entire assembly would be placed in a heated mold and cured.

Typically a tire is formed from long strips of components that are cylindrically wound upon a tire building drum, cut to length and spliced using a lap or butt splice. Thereafter the assembly has the bead cores applied on each end and an apex positioned next to each bead core and then the ply turnup ends are folded over the bead core and apex and then stitched. After which this substantially cylindrical shaped assembly is toroidally shaped by expanding the diameter of the assembly between the beads and the beads are moved towards one another. Thereafter a belt structure and tread are applied and the green tire is then cured in a vulcanizing mold.

These methods of assembly are well known in the building art.

Due to the large number of strip components that are wound onto the building drum to form a tire carcass these strips being cut to length and spliced together at the ends in the manufacture and assembly of a tire means the assembly has to be precisely and tightly controlled to insure that a high quality finished product is produced with uniformity. Each out of place component or over or undersized part or bad splice joint can create a noticeable imbalance or ride disturbance particularly at highway speeds. It is therefore desirable to insure the tires as being manufactured have the strip components made in precisely the right size, positioned properly on assembly, cut to an exact length and properly spliced. Additionally these goals must be accomplished efficiently so the tires are affordable.

To meet these goals it is desirable to automate and in some cases form subassemblies or to make the components at the tire building machine.

The present invention described below provides a unique subassembly used as an intermediate article in the manufacture of a tire and an equally unique method in its manufacture.

SUMMARY OF THE INVENTION

A chipper and apex subassembly as an intermediate article of manufacture in a pneumatic tire has an apex strip formed as a continuous elastomeric strip of unvulcanized material having a bottom base portion and two opposing sides extending towards the narrow outer tip and a chipper ply strip reinforced with parallel cords oriented on a bias angle relative to the length of the strip cojoined to the apex along the length of the strips and attached to one side of the unvulcanized apex strips on an outer surface. The chipper is spaced from the bottom base portion of the apex and extends widthwise towards the narrow outer tip to form a subassembly of a chipper and apex as an intermediate article of manufacture.

The apex strip preferably has a substantially elongated triangular cross section extending from the bottom base towards the outer tip. The width of the apex as measured along the outer surface of one side to which the chipper is attached has a measured width $W_A$ and the chipper ply has a width $W_C$. In one embodiment the width of the apex $W_A$ is greater than or equal to the width of the chipper $W_C$. In an alternative embodiment, the chipper has a width $W_C$ which can be greater than or equal to the width of the apex $W_A$, but nevertheless preferably still spaced from the bottom base portion.

In one embodiment the chipper has cords made of synthetic material. The synthetic cord material preferably is made of carbon fiber cords. Alternatively the chipper can be made from nylon cords or any other suitable synthetic cord such as aramid which is a polyamide material. In another embodiment the chipper and apex subassembly may have the chipper cords made of wire preferably of steel cords.

In another embodiment an annular bead core having a radially inner diametric surface and radially outer diametric surface has the bottom base of the apex with a chipper attached to one side to form a subassembly attached to the radially outer diametric surface. The apex and chipper are wedge cut to length to form opposite ends of increasing circumferential length from the base $L_B$ to the tip $L_P$. The length at the base $L_B$ is equal or slightly less than the circumferential length of the bead core at the radially outer diametric surface and the length of the tip $L_T$ has a length greater than the length $L_B$. The wedge cut ends are abuttingly adjoined at the base and lapped at the tips to form a subassembly of an apex, chipper and bead core as an intermediate article of manufacture.

The various embodiments as intermediate articles of manufacture can be produced using the following method of manufacture of the chipper and apex subassembly which has the steps of extruding a continuous elastomeric unvulcanized apex material having a bottom base and two opposing sides extending from the bottom base to a narrow outer tip to form an apex strip; attaching a chipper ply strip reinforced by parallel bias angle cords or wire and cojoining the chipper ply strip to the apex strip along the length of the apex strip to one side of the unvulcanized apex strip spaced from the base bottom of the apex strip and extending widthwise towards the narrow outer tip to form a subassembly of the chipper ply strip and the apex as an intermediate article of manufacture. The method may further include the steps of winding the chipper apex subassembly onto spools, cutting the chipper apex subassembly after a sufficient length of material is wound to fill the spool. In such a step of filling spools, the method may include attaching a release cloth or liner to one side of the chipper apex subassembly as the subassembly is wound onto the spool. It is preferred that the chipper ply be attached while the extruded apex material is still fresh preferably being applied while the apex is hot coming directly from the extruder die. And may further include the step of cooling the subassembly of chipper and apex prior to being wound onto the spool. The subassembly may then be used in building a tire carcass by applying the chipper apex subassembly onto an unvulcanized cylindrical tire carcass mounted on a tire building drum, one subassembly being at each location adjacent where a bead core is to be applied and then cutting the subassembly to length and splicing the cut ends. In this method of manufacture it is preferably that the step of cutting the chipper apex subassembly includes the step of cutting on a bias angle relative to the length through both the apex and chipper ply between adjacent ply angle cords of the chipper ply to form cut ends. The step of cutting on a bias angle further may include the step of orienting the cutter at a skive angle to form chamfered ends forming a lap splice. Alternatively the method may include attaching the bottom base of the chipper and apex subassembly to a radially outer diametric surface of an annular bead core and prior to completely attaching the chipper apex subassembly cutting a wedge cut into the length of the chipper and apex subassembly across the width to form opposite cut ends of increasing circumferential length from the base $L_B$ towards the narrow tip $L_T$, the length $L_B$ being greater than the length $L_T$. Thereafter in attaching the cut ends to the bead core wherein the joining of the opposite ends are abuttingly joined near the base of the apex chipper subassembly and this joining transitions to a lap joint at the tip to form an apex, chipper and bead core subassembly as an intermediate article of manufacture. Preferably, in the step of wedge cutting includes the step of heating and cutting using a cutting means having two cutting blade edges inclined to form the wedge across the width of the subassembly and cutting through the bias angle cords as the cutting means cuts through the assembly. This is possible with the use of synthetic cords, in that the material of the cords can easily be cut through without damaging the heated blade edges. Alternatively when using metal wire cords in the chipper it is possible to attach the apex chipper subassembly to a radially outer diametric surface of an annular bead core and prior to completely attaching the chipper apex subassembly cutting into the length of the chipper apex subassembly across the width on a bias angle parallel to the cords and tilted on a slight skive angle to form chamfered ends and thereafter attaching the cut ends to the bead core and joining the cut ends to form lap splices across the width of the chipper apex subassembly to form an apex, chipper, bend core subassembly as an intermediate article of manufacture.

Definitions

"Apex" means an elastomeric filler located radially above the bead and interposed between the plies and the ply turn-up.

"Axial" and "axially" means the lines or directions that are parallel to the axis of rotation of the tire.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt Structure" or "Reinforcing Belts" means at least two annual layers or plies of parallel cords, woven or unwoven, underlying the tread, unanchored to the bead, and having both left and right cord angles in the range from 17 degrees to 27 degrees with respect to the equatorial plane of the tire.

"Carcass" means an unvulcanized laminate of tire ply material and other tire components cut to length suitable to splicing, or already spliced, into a cylindrical or toroidal shape. Additional components may be added to the carcass prior to its being vulcanized to create the molded tire.

"Casing" means the tire carcass and associated tire components excluding the tread.

"Chafers" refers to narrow strips of material placed around the outside of the bead to protect cord plies from the rim, distribute flexing above the rim, and to seal the tire.

"Chipper" means a layer or ply of biased angled parallel cords of synthetic or wire material positioned between an apex and a ply turnup.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Insert" means an elastomeric member used as a stiffening member usually located in the sidewall region of the tire.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which at least one layer of ply has the ply cords extend from bead to bead at cord angles between 65 degrees and 90 degrees with respect to the equatorial plane of the tire.

"Shoulder" means the upper portion of sidewall just below the tread edge.

"Sidewall" means that portion of a tire between the tread and the bead.

"Tread" means a rubber component which when bonded to a tire carcass includes that portion of the tire that come into contact with the road when the tire is normally inflated and under normal load.

"Tread Width" means the arc length of the tread surface in the axial direction, that is, in a plane parallel to the axis of rotation of the tire.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1:
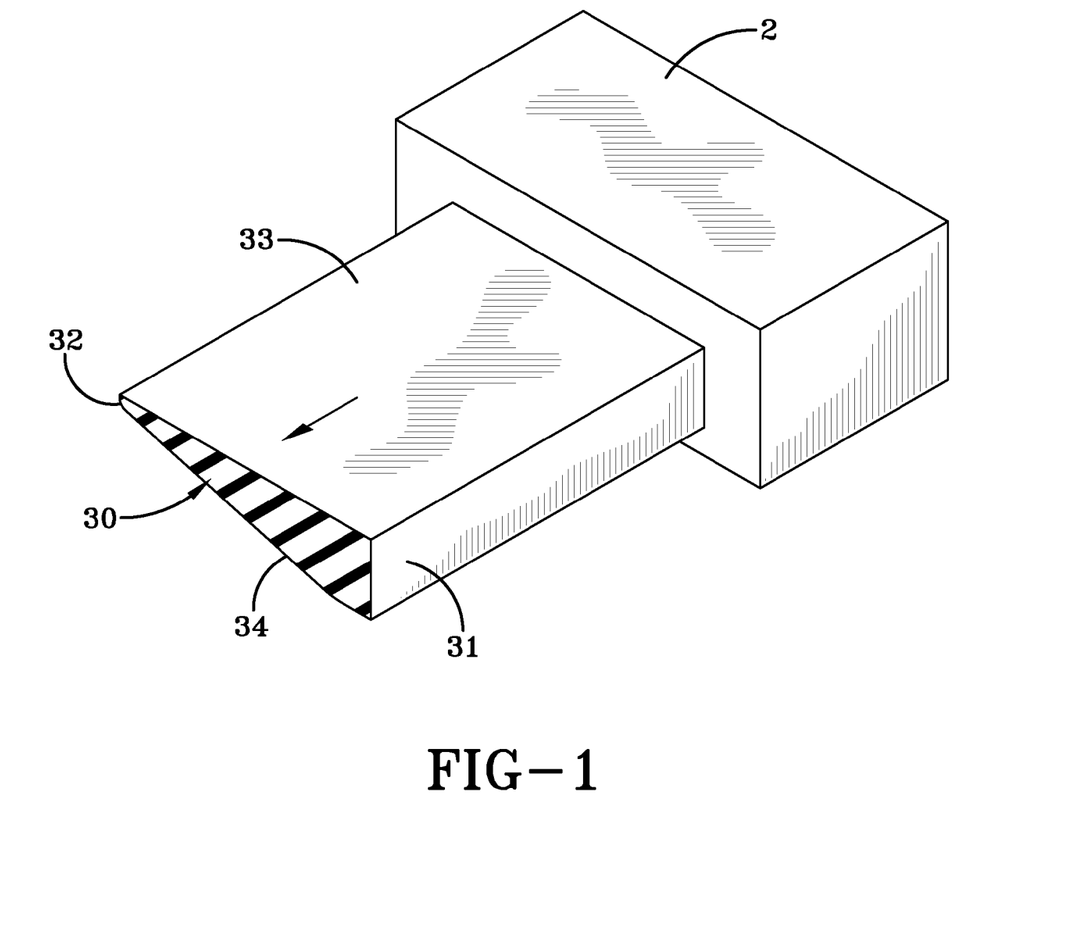
FIG. 1 is a perspective view of an apex forming extruder die with a portion of a formed apex extrudate.

With reference to FIG. 1 an extrudate of elastomeric material is shown coming out of a die head 2. The extrudate 30 as shown has a substantially triangular cross section having a wide bottom base 31 and a two opposing sides 33, 34 extending from the bottom base 31 towards a narrow outer tip 32 thus forming a substantially triangular shaped apex 30. As shown the triangular shape is substantially elongated and there may be a curvature or radius of curvature on the apex so that it is more suited for a specific application when assembled into a particular type of tire construction.

Figure 2:
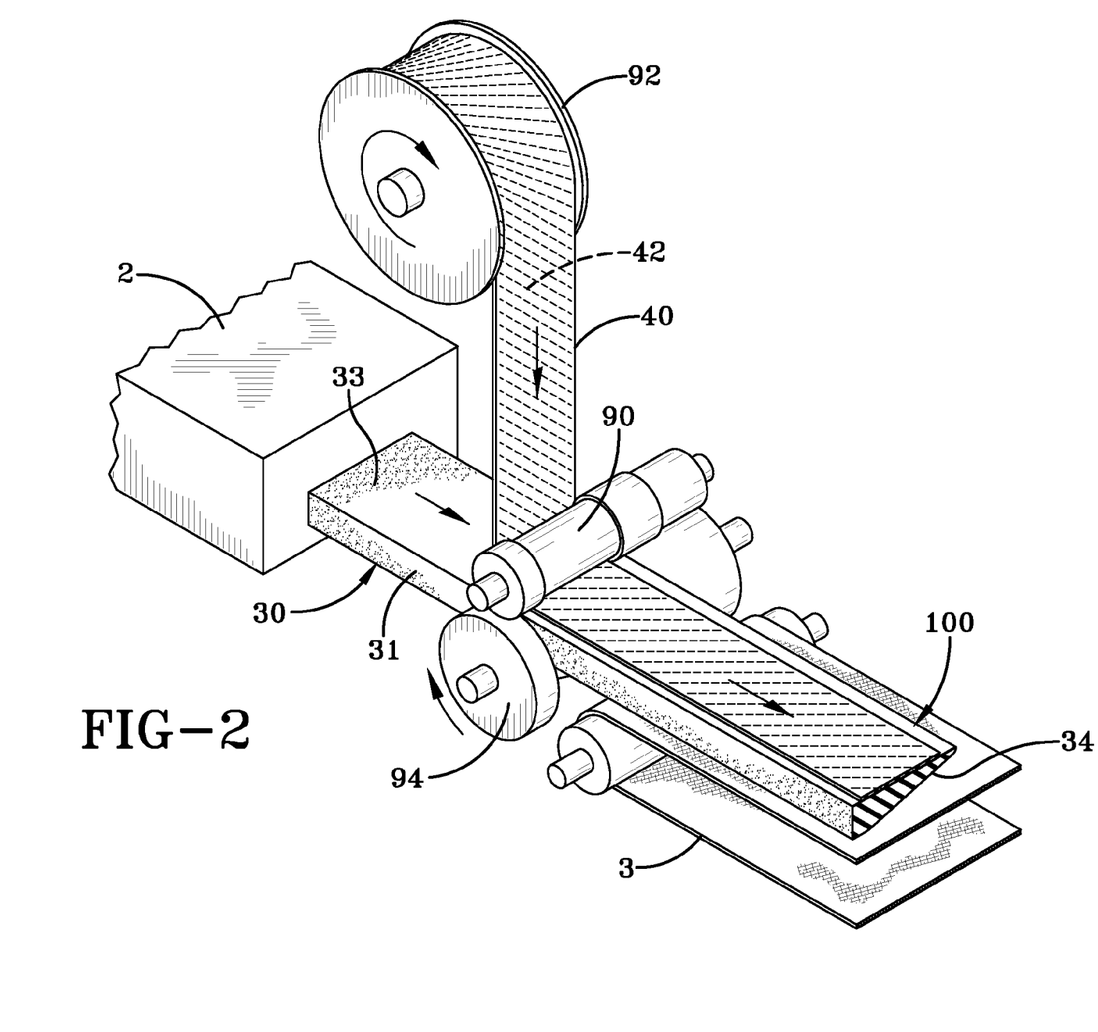
FIG. 2 is a perspective view from the side of the apex forming extruder with a spool of chipper material having a chipper ply being attached to a side of the apex to form a subassembly.
Figure 7:
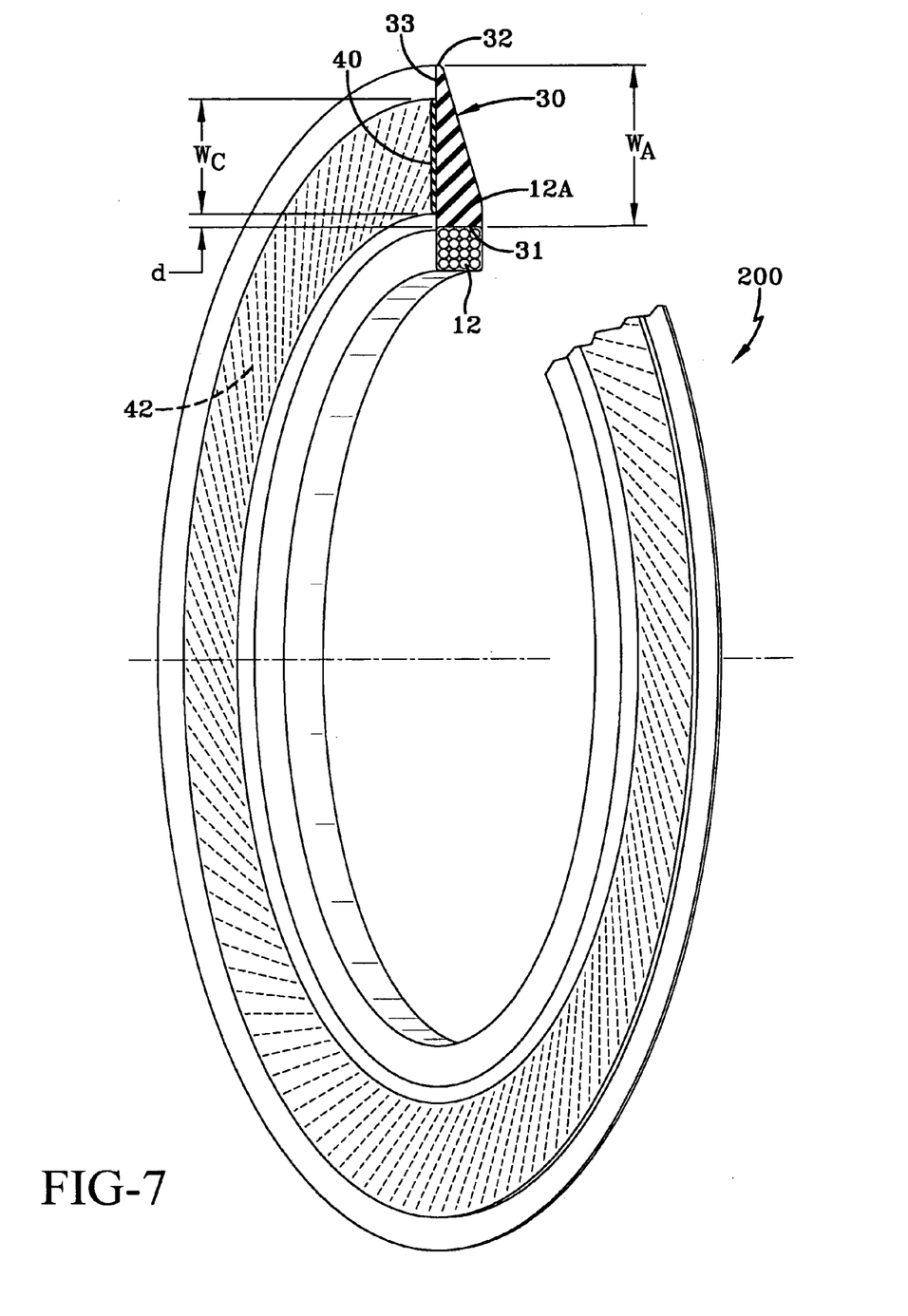
FIG. 7 is a perspective view of an assembled chipper bead core assembly with a cut out portion to show the cross section of the subassembly.

With reference to FIG. 2 the extrudate 30 coming from the die head 2 is placed on a conveyor belt assembly 3 with a roller mechanism 94 locally supporting the apex material the roller mechanism 94 has a flanged stop to help orient the bottom base portion 31 of the apex material 30 precisely relative upper to the roller 90 which guides and stitches a cut to width strip of chipper material 40 coming from an upper spool 92. The chipper material 40 is reinforced with bias angled parallel cords 42, the cords 42 may be of steel wire cord or a synthetic material such as nylon, aramid or in a preferred embodiment carbon fiber cords that are all oriented at an angle less than 65 degrees, preferably 45 degrees. As shown the chipper material 40 is stitched directly onto the apex material 30 as it is passing under the guide roller 90. The chipper material 40 is stitched by the upper guide roller mechanism 90 which further includes a recessed guide surface to help precisely align the chipper 40 with the apex material 30 to which it is going to be attached. As shown in FIG. 7 the chipper material 40 is spaced from the thicker bottom edge 31 by a distance of at least (d), the distance (d) is preferably about ¼ to ½ inch (6 to 12 mm) from the bottom base portion 31 and the chipper 40 extends widthwise toward the narrow outer tip 32. The chipper material 40 may have a width $W_C$ narrower than the total width $W_A$ of the apex 30 as measured along the surface 33 to which it is being attached. In other words the chipper 40 may be completely inward of both ends 31, 32 of the apex 30 or alternatively, while spaced from the bottom base 31 the chipper 40 may have a width $W_C$ that is slightly wider than the width $W_A$ of the apex 30 and therefore may extend over the apex tip 32 if so desired.

Figure 3:
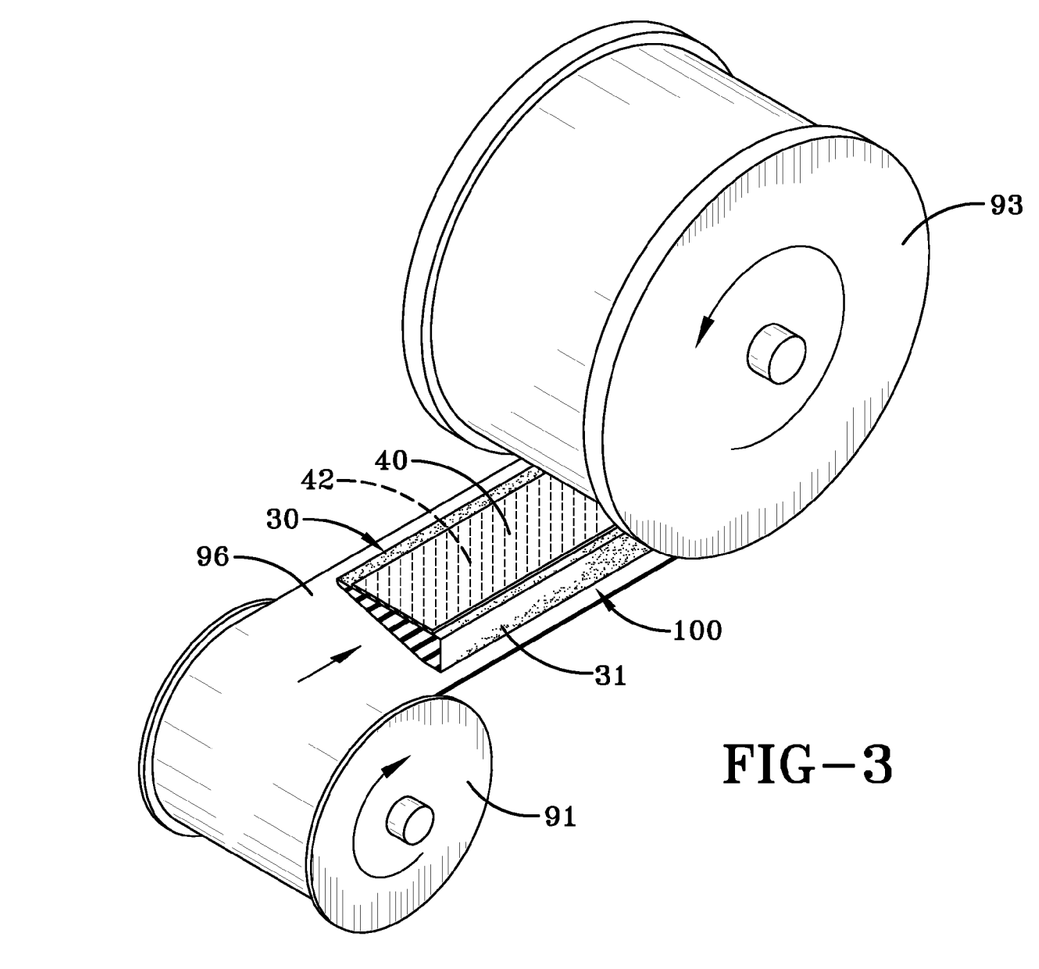
FIG. 3 is a perspective view of the chipper and apex subassembly being wound onto a spool with a liner of release cloth to form a spool of the subassembly.

With reference to FIG. 3 as the chipper material 40 and apex 30 are being stitched they will proceed either through a cooling chamber (not shown) or through a length of conveyor belt loops such that the material can cool sufficiently so that it can be wound onto storage spools 93 as shown in FIG. 3. When being wound onto the storage spools 93 it is preferable that a release cloth or liner 96 is taken from spools 91 and is wound with the subassembly so that the material does not stick upon itself.

As shown in FIG. 2 the chipper 40 has been applied directly onto the extruded apex material 30 while the apex material still hot and fresh. This insures maximum tackiness of the elastomeric material 30 such that an excellent adhesion is achieved between the chipper 40 and the apex 30 such that during subsequent handling the components stay in their proper orientation relative to each other. It is possible that the attachment can be done later in the manufacturing process, however, for optimal tackiness it is preferable that they are done while the apex material 30 is fresh. This avoids the need of using solvents or any other means to insure an excellent adhesion between the chipper strip 40 and the apex strip 30.

Figure 4:
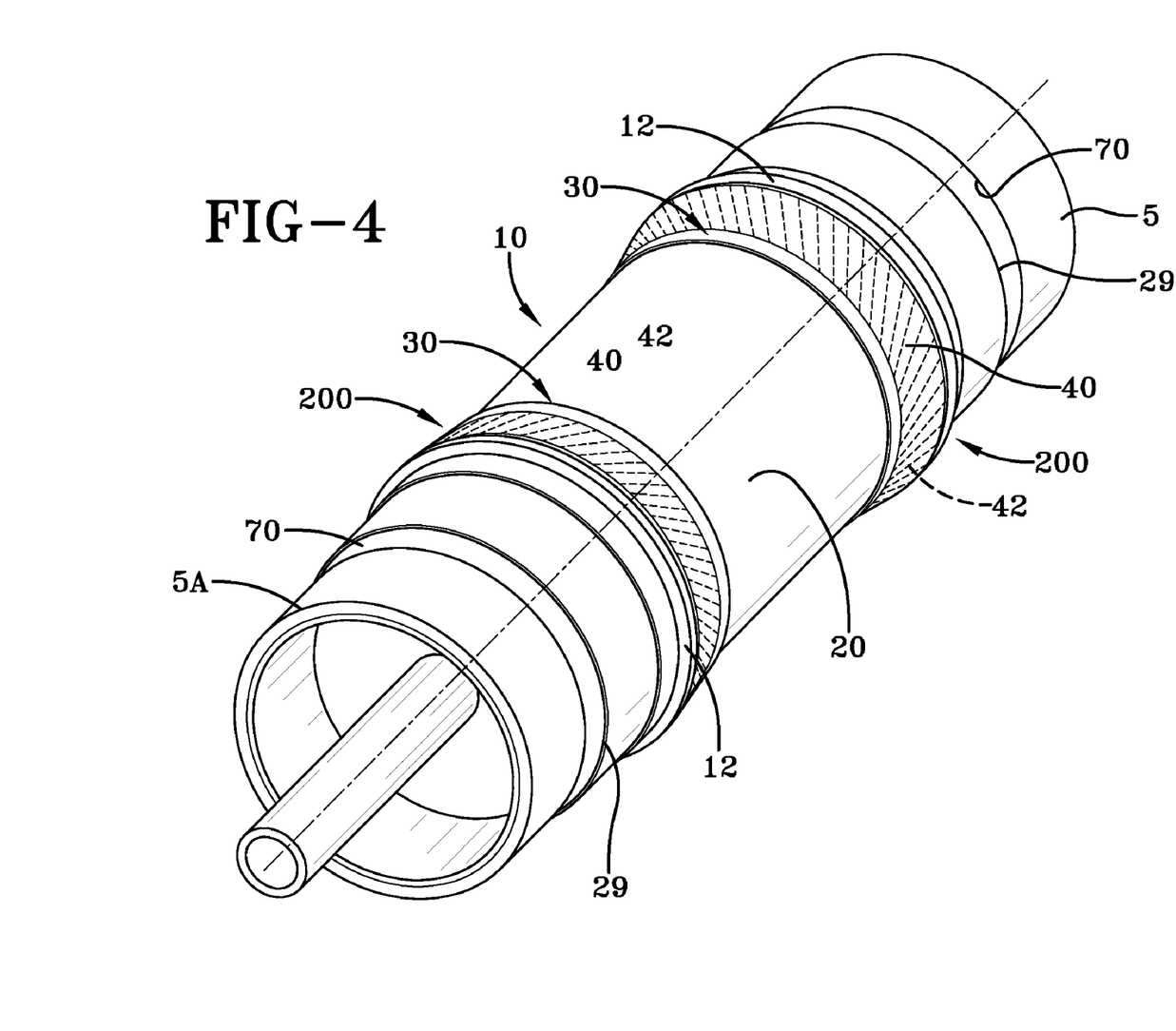
FIG. 4 is a perspective view of a tire carcass building drum showing the chipper and apex subassembly applied in each location adjacent the bead cores.
Figure 5:
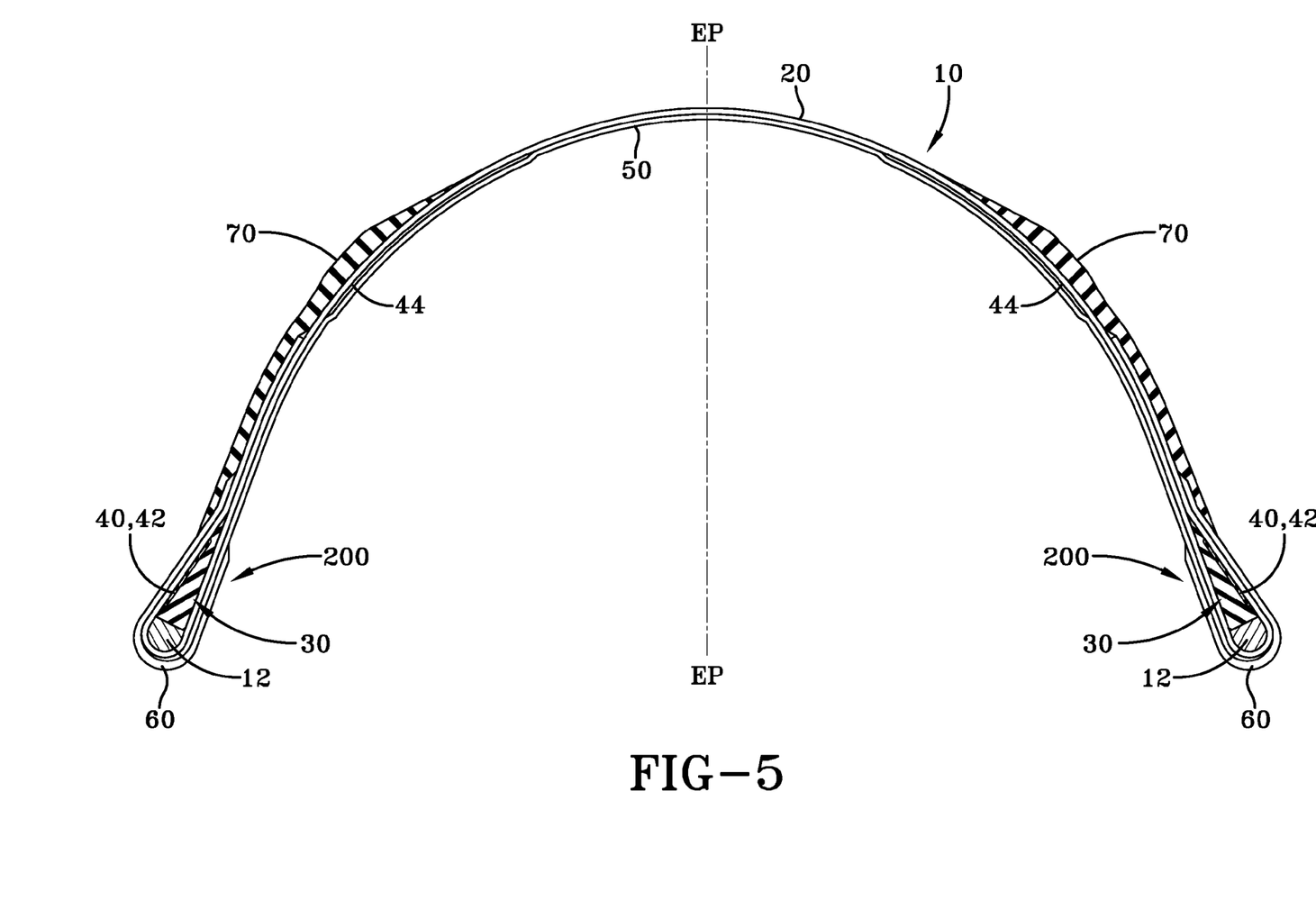
FIG. 5 is a cross section of a toroidally formed tire carcass with the chipper and apex subassembly according to the present invention.

With reference to FIGS. 4 and 5 an exemplary tire carcass building procedure using the subassembly 100 of a chipper 40 and apex 30 is shown and described. The tire building station has a building drum 5 wherein a pair of chafers 66 and a halobutyl liner 50 hidden from view in FIG. 4 are first placed onto the building drum 5, sidewall rubber 70 and gum strips 44 are also applied onto the drum, the liner material 50 is then overlaid by a ply material 20 and the ply material 20 then has the chipper apex subassembly 100 placed in a position axially inward of both of the bead cores 12 as shown. As shown the chipper apex subassembly 100 has the chipper 40 on top of the apex 30 then the beads 12 are applied and then the turnup ends 29 and sidewalls 70 are folded over to make a unvulcanized tire carcass 10 as shown in FIG. 5. The tire carcass 10 achieves a toroidal shape by having the center portion of the green carcass on the building drum 5 inflated using bladders as the beads 12 are brought axially inwardly, thereby creating the toroidal shape thereafter a tread and belt reinforcing structure may be applied to the crown of the carcass 10 as is conventionally done in tire building. Thereafter the entire assembly is placed in a heated mold and the tire can be cured and vulcanized.

The advantage of the above use of a chipper apex subassembly 100 in the manufacture of a tire 10 as described above is that the chipper 40 is precisely located on the apex 30 and that the apex chipper subassembly 100 eliminates the need to separately apply the components. Additionally while the chipper apex subassembly 100 is shown with a single chipper ply 40, it is understood that a second chipper layer could be added to the external surface of the chipper apex subassembly 100 wherein the second chipper ply has cord angles that are equal and oppositely directed relative to the first chipper ply 40. This would create then an optional additional stiffening if needed in the manufacture of the tire. In the embodiment illustrated only one layer of chipper material 40 is used with the apex 30 which will provide sufficient stiffening for the application of a passenger or light truck tire wherein the assembly 100 preferably uses synthetic cords 42. In the manufacture of heavy commercial truck tires a single chipper 40 with steel cords 42 may be used in combination with the apex 30 as a subassembly 100 and will provide the benefits as described above. However, an additional chipper layer 40 may be desirable to add even further stiffening in this area if necessary.

In either case whether it be a passenger or light truck tire or a heavy duty tire the use of the subassembly 100 on both ends of the bead core 12 as described above eliminates one complete rotation of the tire building drum 5 during the building sequence. While they may seem like a minor time savings in the use of automated manufacturing this has tremendous advantages in terms of time saving. Primarily because the chipper 40 is being applied to the apex 30 at the extruder which does not inhibit nor limit the speed of assembly at the tire building machine. This subassembly 100 is made off line so it can be applied at the rates of the extruder which is considerably faster than the overall tire building sequence itself and therefore the subassembly 100 becomes more efficient and eliminates a step at the tire building machine.

Figure 6:
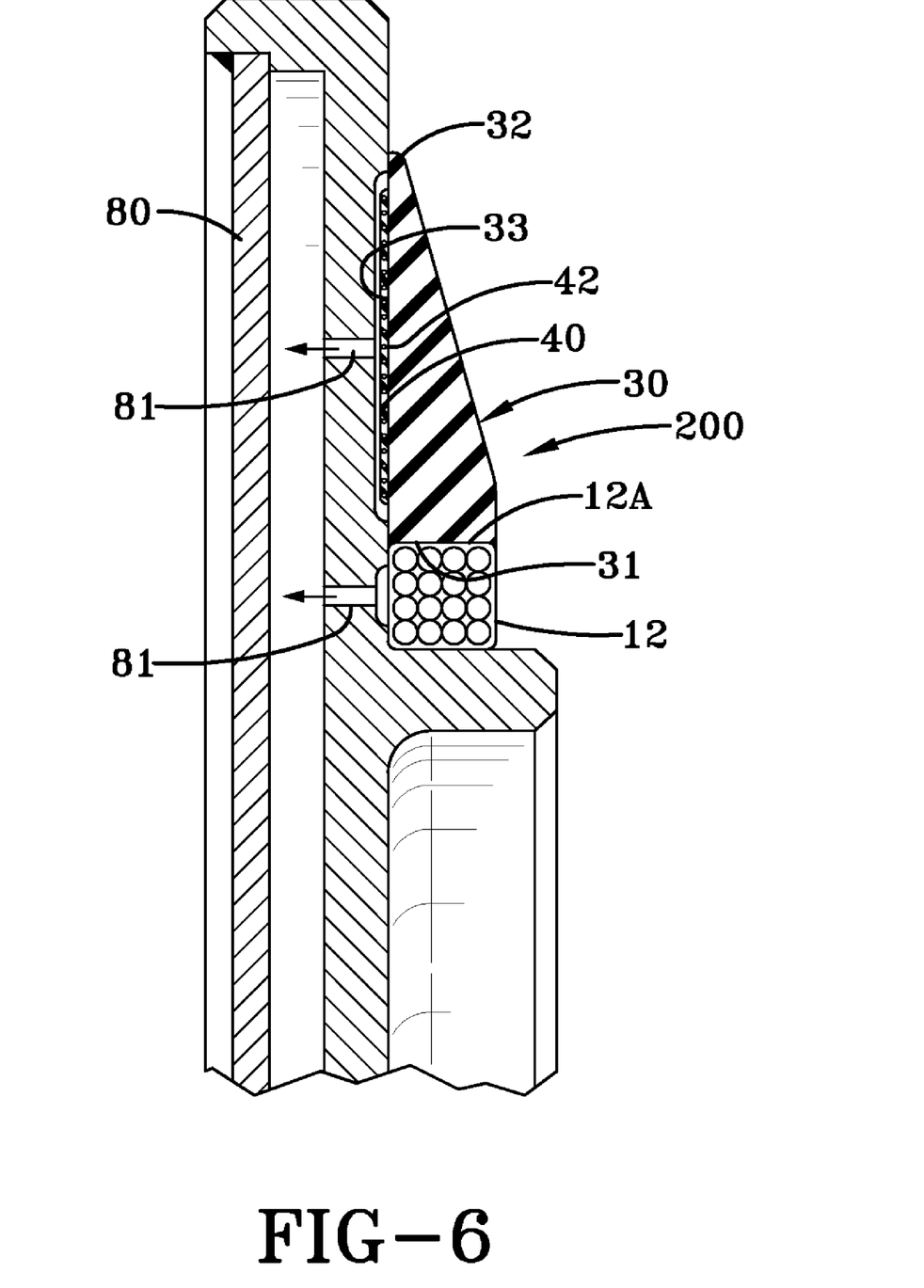
FIG. 6 is a partial cross sectional view of the chipper and apex subassembly according to the present invention on a tire a bead holder being attached to an annular bead core to form a chipper apex bead core assembly.

In the exemplary tire building sequence shown in FIG. 4 the subassembly 100 is shown lying flat on the ply 20 axially inward of and adjacent to each bead core 12. This is one possible method of carcass construction. Alternatively the subassembly could be placed onto the ply turnups and axially outward of an adjacent the bead cores 12. In this case the subassembly would be oriented with the chipper ply 40 against the ply turnups or flipped over as compared to the method shown in FIG. 4. When the trump ends 29 with the subassembly 100 are folded over to wrap the bead cores 12 and be stitched to the ply 20, the entire subassembly 100 is rotated 180 degrees about the adjacent bead cores 12. Thereafter the sidewall rubber strips 70 can be applied over the ply 20 and turnup ends 29. The resultant toroidally shaped carcass 10 will look the same as shown in FIG. 6. In other tire building machines the carcass 10 can be inflated prior to turning the turnup ends 29 to be stitched to the already inflated ply 20. In such a case the subassembly 100 could be applied as described and shown in FIG. 4 or the subassembly 100 could be placed on the turnups and folded upward about 90 degrees or more to make the carcass assembly 10.

Alternatively, the subassembly 200 of FIGS. 6 through 9A with the chipper 40, apex 30 and bead 12 pre-assembled to form the intermediate article of manufacture can be applied in any of the previously described tire building methods. The subassembly 100 will require the additional steps of cutting and splicing the ends on the tire building machine whereas the subassembly 200 has the ends 36, 37 spliced and joined off line at the bead core 12 assembly. This means the pair of subassemblies 200 can be placed onto the tire building machine and at most will involve a rotation of the drum to stitch the apex chipper onto the ply 20 or ply turnup ends 29. Accordingly even more assembly steps are saved at the tire building station.

Figures 8, 8A:
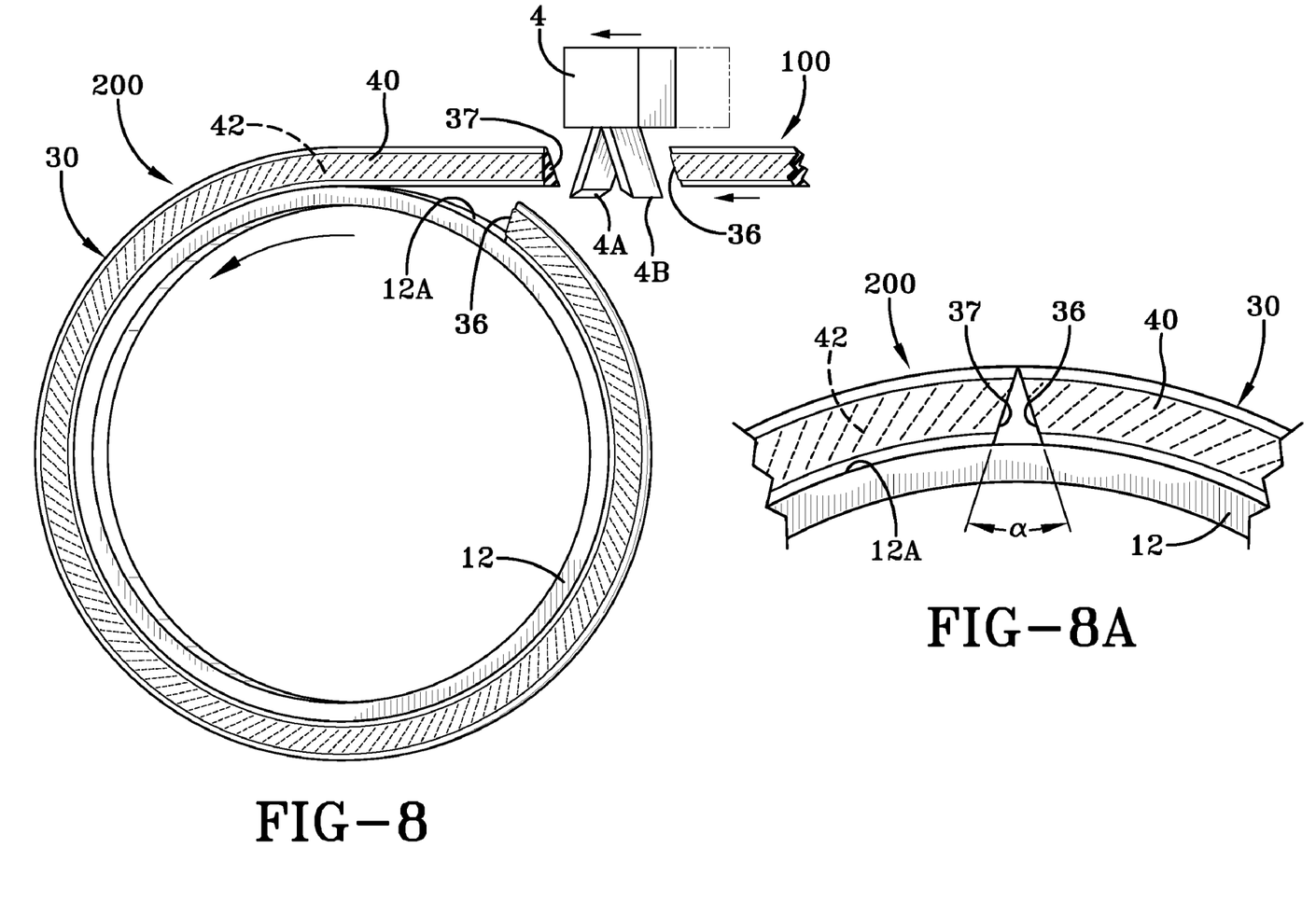
FIG. 8 is a plan view of the chipper and apex subassembly being attached to a bead core having an end wedge cut to form the designed cut length for the assembly.
FIG. 8A shows the wedge shaped cut end prior to being joined.

With further reference to FIGS. 6-9A in an alternative embodiment the chipper apex subassembly 100 once formed can be taken to a bead assembly machine wherein a bead core 12 is mounted on a mandrel 80 then the subassembly 100 can be applied directly to a diametric outer surface 12A of the bead core 12 joining the bottom bead base 31 directly on the diametrically outer surface 12A as shown in FIG. 6. Vacuum holes 81 can be provided to help secure the bead core 12 and subassembly 100 to the mandrel 80. Once accomplished the subassembly 200 of a chipper 40, apex 30, bead core 12 can be completed as shown in FIGS. 7, 8 and 8A wherein a triangular cutter head 4 can create a pie shaped at one end of the length of chipper apex material as the material is being wound onto the bead core 12. The trailing end 37 of the strip of material can be cut with a wedge shaped cutter 4 such that the diametrically inner portion of the subassembly has a cut length $L_B$ where the outer portion of the strip has a cut length $L_T$, the length $L_B$ being substantially equal to or less than the circumferential length at the diametrically outer surface 12A and therefore as the subassembly is cut the ends 36, 37 can be abuttingly joined at the base 31, however, because the length $L_T$ at the radially outer tip 32 is longer than the length $L_B$ at the base 31 the tips 32 can be lap joined. This is possible because the tips 32 are substantially narrower and this creates virtually no noticeable uniformity concerns at the joints due to the minimal amount of material at the tips 32. This further provides a very secure joint that is a combination of a butt splice and lap splice at the chipper apex subassembly 100 making it a very durable joint. This subassembly 200 then can be taken to a tire building machine. The apex chipper subassembly 100 is mounted vertically onto the bead cores 12 can be taken to and slipped directly onto the tire building drum 5. Thereafter the apex chipper subassembly 100 can be folded axially inwardly on both sides as shown in FIG. 4 and stitched to the inner surface of the ply 20 thereafter the turnups 29 can be folded over as in a conventional manner and then the tire inflated and shaped toroidally as was previously described. This cutting employs the use of a knife 4 for having a pair of cutting edges 4A and 4B that are heated and oriented to create a triangle wedge shaped cut out. As shown in FIG. 8 this wedge shaped cut out has an included angle α and passes directly through the elastomeric apex 30 and through the chipper cords 40 when the chipper cords 42 are manufactured out of synthetic material. The direct cutting through the cords 42 can be accomplished with relative ease. Having accomplished this the cut surfaces of the ends 36, 37 can then be abutingly joined as previously described.

Figures 9, 9A:
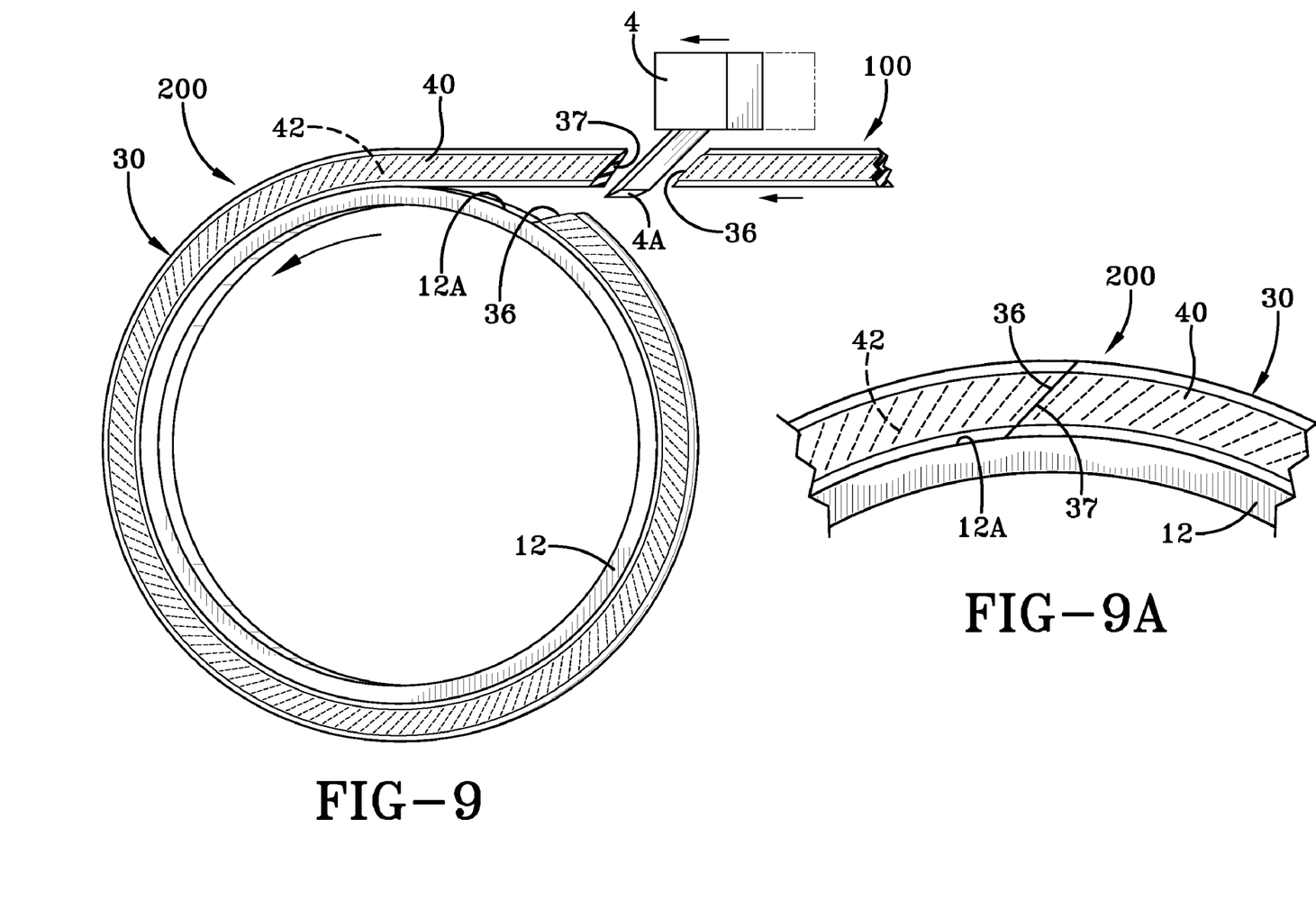
FIG. 9 is a plan view of the chipper apex subassembly being cut parallel to the chipper cords to form a cut length with skewed ends for forming a lap splice as the subassembly is being attached to the bead core.
FIG. 9A shows the spliced cut ends joined.

In an alternative embodiment shown in FIG. 9 when using metal cords 42 is it possible to apply the chipper apex subassembly 100 directly onto a bead core 12 as was previously described, however, in this case a single blade 4A can be used oriented on a slight skive angle to create chamfered edges on the ends 36, 37. This single blade 4A must be oriented parallel to the metal cords 42 such that as the blade passes through the material it will go between the chipper cords 42 to make the cut. By having the blade angle on a skive angle, the chamfered surfaces can be abuttingly joined in a slight overlap. In this invention the apex chipper bead core subassembly 200 is most useful in heavy commercial truck tires wherein metal chippers are commonly employed. The same advantages as previously mentioned with the synthetic chipper cord 42 are that the entire subassembly can be achieved at a much greater rate of speed and with greater uniformity than heretofore achieved and as described before the subassembly 200 can then be taken to the tire building machine wherein the bead core chipper apex subassembly 200 can be mounted on the tire building drum 5 as a single unit. The chipper and apex portion 40, 30 an be folded over and stitched directly to the ply 20 prior to the tire carcass 10 being toroidally shaped. Alternatively the subassembly 200 can be applied using any of a variety of tire building techniques as were previously noted. One of the unique features of the present invention is that by using a single chipper ply 40 it is possible to fold the assembly over when mounted onto a bead core 12 due to the fact that the cords can move and as they roll over they are free to move slightly to the desired shape. This is commonly referred to as pantographing. Once the tire is then inflated to a toroidal shape the chipper 40 and apex 30 are rotated back to an almost vertical orientation wherein the cords 42 tend to resume their normal orientation. This has a tremendous advantage in that the cords 42 are oriented substantially as manufactured in the subassembly 100 or 200 without any additional memory or stresses in the unvulcanized tire.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of applicants' general inventive concept.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of manufacturing, storing and using a chipper and apex subassembly formed in a continuous length as an intermediate article of manufacture in the building of a pneumatic tire comprising the steps of:
   extruding a continuous elastomeric strip of unvulcanized material having a bottom base and two opposing sides extending from the bottom base toward a narrow outer tip to form an apex strip;
   attaching a continuous length chipper ply strip reinforced by parallel bias angled cords or wire cojoining the chipper ply strip to the apex strip while the apex strip is hot along the length of the strip to one side of the unvulcanized apex strip spaced outward from the base bottom of the apex strip by a distance at least 6 mm and extending widthwise toward the narrow outer tip to form a continuous length subassembly of a chipper ply and an apex as an intermediate article of manufacture,
   cooling the chipper apex subassembly;
   winding the cooled chipper apex subassembly onto spools;
   cutting the chipper apex subassembly after a sufficient length of material is wound to fill the spool; and
   moving the full spool to storage for subsequent use in building tires for better cutting into cut to length individual strips of the subassembly in building tires.

2. The method of claim 1 further comprises the step of:
   attaching a release cloth or liner to one side of the chipper apex subassembly as being wound.

3. The method of claim 1 wherein the chipper ply is attached to the extruded apex while the material of the apex is hot; the method further comprising the step of cooling the subassembly of chipper and apex.

4. The method of claim 1 further comprises the steps of:
   applying the continuous length chipper apex subassembly onto an unvulcanized cylindrical tire carcass mounted on a tire building drum at each location adjacent where a bead core is to be applied;
   cutting the subassembly to length; and
   splicing the cut ends.

5. The method of claim 4 wherein the step of cutting the continuous length chipper apex subassembly includes the step of cutting on a bias angle relative to the length through both the apex and the chipper ply between adjacent bias angled cords of the chipper ply to form the cut ends.

6. The method of claim 5 wherein the step of cutting on a bias angle further includes the step of orienting the cutter at a skive angle to form chamfered cut ends for forming a lap splice.

7. The method of claim 1 further comprises the steps of:
   attaching the bottom base of the apex of the continuous length chipper and apex subassembly to a radially outer diametric surface of an annular bead core and prior to completely attaching the chipper apex subassembly;
   cutting a wedge cut into the continuous length of the chipper and apex subassembly across the width to form opposite cut ends of increasing circumferential length from the base $L_B$ toward the narrow tip $L_T$, the length $L_B$ being equal to or slightly less than the circumferential length of the bead core at the radially outer surface and the length at the tips $L_T$ having a length greater than the length $L_B$, ends being abuttingly joined at the base and lapped at the tips to form a subassembly of an apex, chipper bead core as an intermediate article of manufacture;
   attaching the cut end to the bead core; and
   joining the opposite ends, the ends being abuttingly joined at the base and transitioning to a lap joint at the tip to form an apex chipper bead core subassembly as an intermediate article of manufacture.

8. The method of claim 7 wherein the step of wedge cutting includes the step of heating the cutting means having two cutting edges inclined to form a wedge across the width of the subassembly and cutting the bias angled cords as the cutting means cuts the subassembly.

9. The method of claim 1 further comprises the steps of:
   attaching the bottom base of the chipper and apex subassembly to a radially outer diametric surface of an annular bead core and prior to completely attaching the chipper apex subassembly;
   cutting into the continuous length of the chipper and apex subassembly across width on a bias angle parallel to the cords and tilted on a skive angle to form chamfer cut ends;
   attaching the cut end to the bead core; and
   joining the cut ends to form a lap splice across the width of the chipper apex subassembly to form an apex chipper bead core subassembly.

* * * * *